United States Patent [19]

Nguyen et al.

[11] Patent Number: 5,021,983

[45] Date of Patent: Jun. 4, 1991

[54] SUSPEND/RESUME APPARATUS AND METHOD FOR REDUCING POWER CONSUMPTION IN BATTERY POWERED COMPUTERS

[75] Inventors: Au H. Nguyen, Santa Clara; Aurav R. Gollabinnie, San Jose, both of Calif.

[73] Assignee: Chips and Technologies, Inc., San Jose, Calif.

[21] Appl. No.: 434,201

[22] Filed: Nov. 13, 1989

[51] Int. Cl.$^5$ .............................................. G06F 1/00
[52] U.S. Cl. ...................................... 364/707; 371/66
[58] Field of Search ...................... 364/707, 200, 900; 371/66

[56] References Cited

U.S. PATENT DOCUMENTS

| | | | |
|---|---|---|---|
| 4,458,307 | 7/1984 | McAnlis et al. | 371/66 X |
| 4,461,003 | 7/1984 | Tamaki | 371/66 |
| 4,523,295 | 6/1985 | Zato | 364/900 |
| 4,646,307 | 2/1987 | Nishimura | 371/66 X |
| 4,658,352 | 4/1987 | Nagasawa | 371/66 X |
| 4,757,505 | 7/1988 | Marrington et al. | 371/66 |
| 4,763,333 | 8/1988 | Byrd | 371/66 |
| 4,782,468 | 11/1988 | Jones et al. | 371/66 X |

Primary Examiner—Dale M. Shaw
Assistant Examiner—Tan V. Mai
Attorney, Agent, or Firm—Townsend and Townsend

[57] ABSTRACT

A method and apparatus for suspending the operation of a computer at any desired point and resuming operation at exactly the same point is disclosed. At the point where suspension is chosen, the current state of the computer is stored in the computer's Random Access Memory and power is disconnected to all other components in the computer. When resumption of operation is commanded, power is restored to all components and the current computer state is retrieved from the Random Access Memory and restored, allowing operations to continue from exactly the same point as they were suspended. The invention encourages turning off the computer for even brief periods of non-use, as there is almost no waiting time when resumption of operation is commanded.

9 Claims, 3 Drawing Sheets

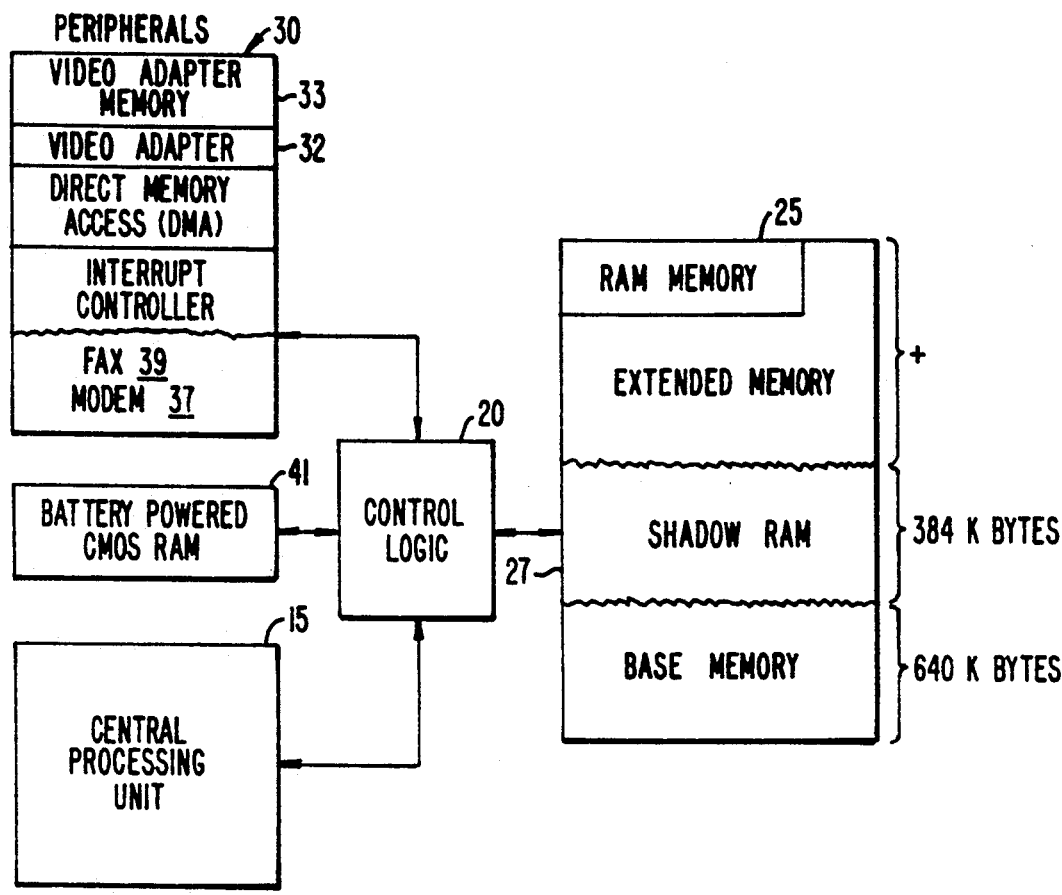
FIG._1.
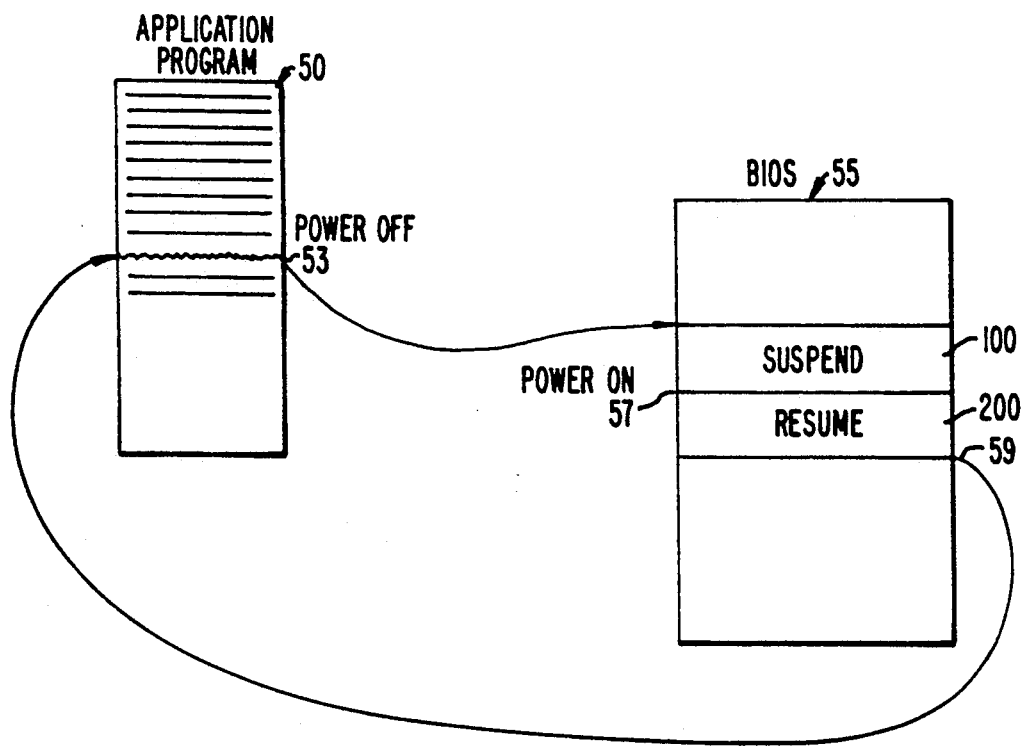
FIG._2.

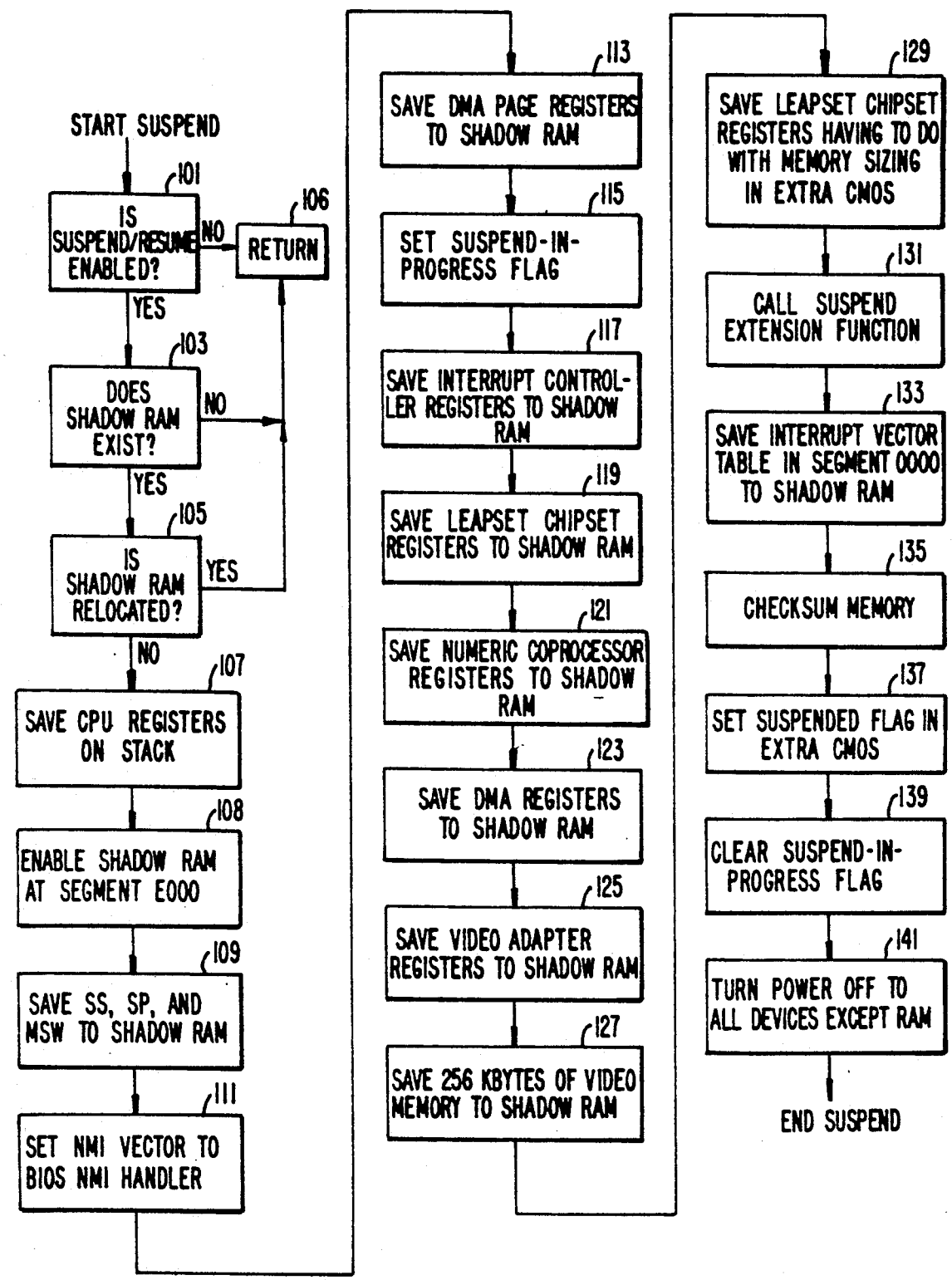
FIG._3A.

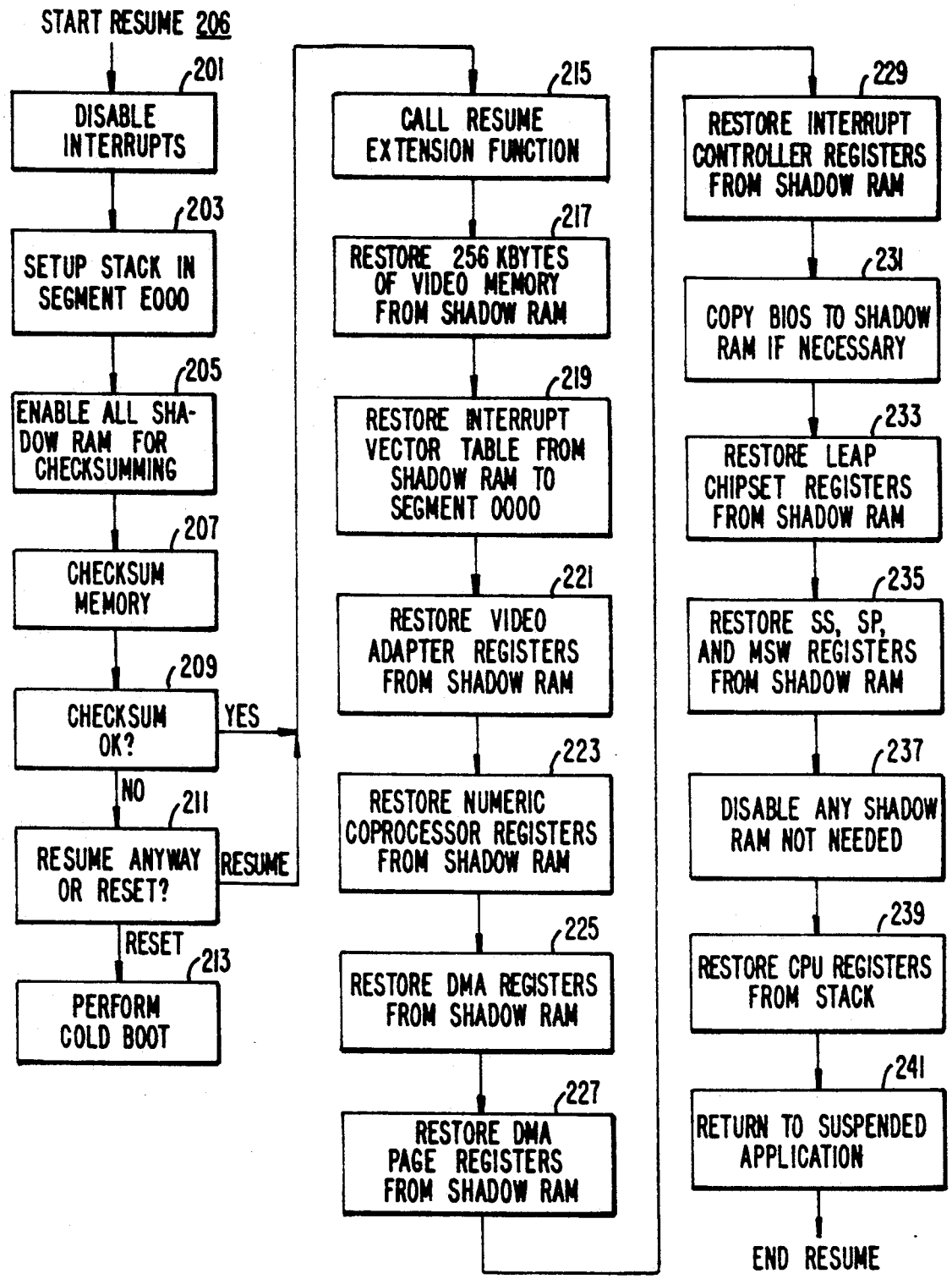
FIG._3B.

SUSPEND/RESUME APPARATUS AND METHOD FOR REDUCING POWER CONSUMPTION IN BATTERY POWERED COMPUTERS

BACKGROUND OF THE INVENTION

The present invention relates to digital computers. More specifically it is a power saving method and apparatus for battery powered computers.

Reducing power consumption in any electrical device is always a desireable goal. In battery powered computers this goal takes on particular urgency. For example, most battery packs can only power a computer for a few hours of continuous use. Without the incorporation of some form of power consumption reduction mechanism, a computer powered by such a battery pack will not be useable for an entire trans-continental flight.

The simplest solution to this problem is to turn the computer off during any period of non-use. Unfortunately, this solution has a high cost in user convenience. Most computers go through a complete "re-booting" process every time power is turned off and on, the length of which process can be very annoying to the user. Additionally, the user is frequently called upon to restart his application and read from a stored file after the re-booting process is complete, all of which requires additional time. The time required for both re-booting and re-starting the programs can range from 30 seconds to several minutes. Such delays discourage the user from turning the computer off except during periods of extended non-use.

To encourage the user to turn off the computer during any period of non-use, some method or apparatus which can shut the computer down and then resume operation without requiring a re-booting process and which can return the user to exactly the same place and condition as preceded the shutdown would be very desirable.

SUMMARY OF THE INVENTION

The present invention is a method and apparatus which reduces power consumption in battery powered computers by eliminating the inconvenience of a re-booting operation every time the computer is turned off, thereby encouraging the user of the computer to turn off the computer during even short periods of non-use. The on/off switch used in the preferred embodiment of the present invention is not a mechanical switch but rather an on/off digital signal generator. The activation of the power switch provides a digital 'Off' signal to the present invention. The present invention then stores the present state of the computer in random access memory ('RAM') off power to all devices except the RAM. When the user reactivates the power switch, providing an 'On' signal, the stored present state in the RAM is used to place the computer in exactly the same state it was in prior to the triggering of the 'Off' command. Only an abbreviated Power On/Self-Test ('POST') procedure is conducted when the 'On' signal is received and no tests are performed on the memory. The operator is thus able to resume operation of the computer at the same point where operations were being conducted when the machine was turned off with a minimum of delay.

BRIEF DESCRIPTION OF THE FIGURES

The present invention will now be described in conjunction with the following figures, in which FIG. 1 is a block diagram of the operating environment of the present invention;

FIG. 2 is a high-level flow chart showing the allocation of control between the present invention and the application program; and FIGS. 3A and 3B are flow charts showing the operation of the present invention.

BRIEF DESCRIPTION OF THE APPENDICES

Appendix A contains the computer software which realizes the present invention. It is written in the 80286 assembly language; and Appendix B is a brief description of the LeAPset chipset.

DETAILED DESCRIPTION OF THE PREFERRED EMBODIMENT

FIG. 1 is a block diagram of the operating environment of the present invention. The figure shows the basic elements of a portable computer. Central processing unit ('CPU') 15 is coupled to Control Logic 20, which in turn is coupled to RAM 25 and to the various peripheral devices represented by block 30. The peripherals listed in block 30, video adapter 32, Direct Memory Access ('DMA') 34, and Interrupt Controller 36, are used for illustration purposes only. Although a video adapter will almost always be used with the present invention, the addition or elimination of any group of peripherals will not affect the operation of this invention. For example, as indicated in FIG. 1, either a modem 37 or a FAX machine 39 might be included among the peripherals. Video adapter 32 has a related memory 33 which is generally used to store the information being displayed on the video screen (not illustrated). Also not shown is the digital On/Off switch which provides the actuating signals to the Suspend/Resume mechanisms. CMOS RAM 41 is powered by an independent battery and contains system configuration information.

The present invention can only be implemented in a personal computer wherein control logic 20 is realized by using the LeAPset group of integrated 10 circuits described in Appendix B. Additionally, the computer must be an IBM PC AT compatible model. Finally, Shadow RAM 27 in RAM 25 is needed. Shadow RAM 27 occupies the space in RAM 25 from 640K bytes to 1024K bytes. This area in RAM 25 is normally unused in IBM PC AT compatible machines.

FIG. 2 shows the high level operation of the present invention. Hypothetical application program 50 is running on a battery powered computer (not shown in FIG. 2). At point 53 during the use of the application program the On/Off switch is triggered. Machine operation then transfers from application program 50 to Basic Input/Output Software ('BIOS') 55 which controls the computer's input/output operations. BIOS is a software interface or "layer" that isolates operating systems and application programs from specific hardware devices. In other words, BIOS 55 is the hardware dependent part of the computer's operating system. BIOS 55 knows the specific peripherals which have been coupled to the computer and controls their operation. Although the present invention resides within BIOS, a detailed understanding of the BIOS is not necessary for understanding this invention. All necessary background information on BIOS can be obtained from the "IBM Personal System/2 and Personal Computer BIOS Interface Technical Reference," 2nd Edition, May 1988, which is incorporated herein by reference.

Upon receipt of 'Off' signal 53, the Suspend mechanism 100 stores the machine's current state in shadow RAM 27. To those skilled in the art, the term 'state' in reference to computer operation means the present contents of all the registers in all the components used by the computer. In the present invention, 'state' refers to the contents of the CPU's 10 registers, the DMA registers, the video adapter registers, the Interrupt Controllers registers, and the registers in other supported peripherals. Once the machine's current state is stored in shadow RAM 27, power is cut off to all components except RAM 25. When the power switch is reactivated and 'On' signal 57 generated, which indicates that computer operations should be resumed, Resume mechanism 200 restores the contents of shadow RAM 27 to the various component registers and, at step 59, returns program control to application program 50 at the same point where BIOS 55 was originally called.

FIGS. 3A and 3B are detailed flow charts showing the operation of Suspend mechanism 100 and Resume mechanism 200. The software contained in Appendix A realizes both mechanisms and all references to Appendix A will be given as line numbers. References to FIGS. 3A and 3B will use step numbers.

Suspend mechanism 100 cannot be activated without three prerequisites. First, the feature must be enabled. During the original booting up operation the user is given a choice of how to configure the computer. If the user enables the Suspend/Resume mechanisms, one bit in CMOS battery powered back-up RAM 41 is set to indicate that the feature has been selected. This check occurs at step 101 (line 35). Second, the computer must have shadow RAM which test is made at step 103 (lines 37-41) and third, the shadow RAM must be in a specific place (in other words, not relocated) which check occurs at step 105 (lines 37-41). If any of these conditions are not met, a call to Suspend results in either a complete machine 'power off' in the case where the function is called from the power switch, or the Suspend request is ignored if the function was called from an application program or keyboard interrupt and control returns to the application program. This is shown at step 106 (lines 48-56).

If Suspend is enabled and shadow RAM is present and unmoved, operation continues at step 107 by pushing all the registers of the CPU onto the applications stack which stack exists in RAM 25 (lines 62-85). Two CPUs are supported—the 80386SX and 80286. The only difference between the operation of the present invention with either of these two CPUs is the number of registers to be saved.

As most registers cannot be saved on the application's stack, shadow RAM 27 must be enabled at step 108 (lines 90-91). Shadow RAM 27 must be separately enabled as it cannot ordinarily be written to or read from.

At step 109 CPU registers SS, SP, and MSW are saved separately in shadow RAM 27 (lines 98-103). Although this is a slight redundancy, as register SP was pushed on the application stack at step 107, these registers must be stored in a location outside the stack so that the stack itself can be found using the information contained in these registers when Resume 200 begins operation.

To prevent any corruption of the data in memory due to interference from other software during the Suspend mechanism's operation, the Non Maskable Interrupt ('NMI') vector is disabled at step 111 (lines 108-127). This results in disabling any other software operating concurrently.

After the CPU registers have been pushed on the stack, the DMA Page registers are stored in shadow RAM 27 at step 113 (lines 140-147). The DMA Page registers in combination with the DMA registers provide complete address information for direct memory access.

At this point, Suspend-In-Progress flags are set in an unused DMA page register at step 115 (lines 158-161). This flag prevents the computer from going to a complete power shut down during the time the Suspend mechanism is performing its tasks. If the flag was not set, power shut down would occur within seconds after the power On/Off switch was triggered, which might be insufficient time for Suspend to complete its operations.

The interrupt controller registers are stored in shadow RAM 27 at step 117 (lines 170-174). Then Control Logic 20's LeAPset chipset registers are stored RAM 27 at step 119 (lines 178-188). At step 121 the numeric coprocessor register is stored in shadow RAM 27 (line 197). The DMA registers are then stored in shadow RAM 27 at step 123 (lines 208-243). The VGA registers are saved at step 125 (lines 247-250). With regards to the video RAM, the first 256K therein is stored at step 127 (lines 254-265). The registers controlling memory sizing in the LeAPset chipset are then saved in CMOS RAM 41 at step 129 so that memory can be configured upon Resume without access to DRAM (lines 270-286). If additional peripherals such as a modem or FAX have been coupled to the computer, the registers related thereto are stored at step 131 (lines 291-292). Finally, a small area of RAM is reserved at step 133 for Power On Self-Test ('POST') after Resume 200 is activated (lines 297-303).

In order to insure that memory is unaffected by the Suspend feature, all the bytes of memory are added together and stored. This occurs at step 135 (lines 307-308) Upon Resume, the same process again adds up all the bytes in memory and compares the sums. If they do not agree, the Resume function fails and re-booting can occur.

After the memory bytes are added, the 'Suspend' bit in CMOS RAM 41 is turned on at step 137 (lines 313-317). This tells the machine that the computer is suspended. Next, the Suspend-In-Progress bit is cleared at step 139 (lines 322-323). At step 141, all machine operation is halted and power is cut to all chips and components except the RAM memory (lines 327-331).

The Resume mechanism 200 is essentially Suspend mechanism 100 operated in reverse. First, once the power switch is triggered to provide an "On" signal, an abbreviated POST is performed. Ordinarily in the absence of the Suspend/Resume mechanism, a full POST is performed every time the computer is turned on. Here, when Suspend/Resume are activated, the abbreviated POST tests all components except the memory. The test is necessary as the power surge accompanying Power On can damage components. If the POST is conducted successfully, then the Resume mechanism begins operation.

At step 201 (FIG. 3B) interrupts are disabled while the Resume mechanism operates (line 343). Next, the resume stack is set up in shadow RAM 27 at step 203 (lines 347-350).

Memory checking commences at step 205, where the shadow RAM is enabled for the Checksum operation (line 356). The Checksum addition of memory occurs at step 207 (lines 360-362). At step 209, a comparison is made between the Checksum values stored by Suspend 100 and those obtained by Resume 200 (lines 363-369). If the sums do not agree, the user can either continue Resume, accepting the risk of possible false values stored in memory or do a complete re-boot. The choice is given at step 211 (lines 373-395). Re-booting operations occur at step 213 (lines 387-389).

Resume operations continue at step 215 if either the Checksums agreed or the user chose to continue Resume. Here, the registers of the optional peripherals such MODEMs or FAXes are recalled and restored, if necessary (lines 400-404). The stored 256K of video RAM is restored at step 217 (lines 408-420). At step 219 the interrupt vector table is restored from shadow RAM and placed in segment 0000 (lines 425-436).

Video adapter registers are restored at step 221 (lines 440-445), the numeric coprocessor registers are restored at step 223 (lines 449-450), and the DMA registers and DMA Page registers are restored at steps 225 and 227, respectively (lines 454-521 and lines 525-532, respectively). Finally, the interrupt controller registers are restored at step 229 (lines 536-539).

If necessary, BIOS is copied to shadow RAM at step 231 (lines 543-577). Control logic 20's LeAPset registers are restored from shadow RAM at step 233 (lines 581-592). The last registers recalled from shadow RAM, the SS, SP and MSW registers are restored at step 235 (lines 597-618).

At step 237 any shadow RAM no longer being used is disabled (lines 623-625). The CPU is restored to its pre-Suspend state by popping its registers off the stack at step 239 (lines 629-652). At this point, the return address on the stack is used to return control to the application program at the point where control was transferred to Suspend. This completes the description of the Suspend/Resume mechanisms.

The invention has now been described in relation to a particular embodiment thereof. Although limited at present to battery powered IBM PC AT compatibles wherein the LeAPset chipset is used, the general concept of a Suspend/Restore mechanism would be useful in any computer, even if powered by a conventional A.C. power source. Changes and adaptions to the software of Appendix A would be necessary to enable the invention to operate in these different environments, but the reduction of user waiting time achieved by eliminating the re-booting process would be a significant convenience. As these changes in form and details would be understood by those skilled in the art, they do not depart from the spirit of the invention. It is therefore intended that an exclusive right be granted to the invention as limited only by the metes and bounds of the appended claims.

EXHIBIT A

```
1   ;-----------------------------------------------------------------
2   ; Macros to push and pop '386 special registers, e.g. Debug Registers,
3   ; via the accumulator.
4   ;-----------------------------------------------------------------
5
6   MPUSH   MACRO   Register
7           MOV     EAX,Register
8           PUSH    EAX
9   ENDM
10
11  MPOP    MACRO   Register
12          POP     EAX
13          MOV     Register,EAX
14  ENDM
15
16  ;*********************************************************************
17  ; This is the suspend function.  It is called via INT15, AH=42, AL=C1 or C2.
18  ; C1 is for the NMI interrupt handler or any application.  C2 is for the
19  ; keyboard interrupt handler.  It will return after the system has resumed.
20  ; We have two different codes for suspend so that one way to suspend can be
21  ; more verbose/user-friendly than the other, e.g. asking are you sure, etc.
22  ;*********************************************************************
23
24  Suspend PROC    NEAR
25
26  ; Check to see if we have the right ingredients for doing a suspend,  i.e.
27  ; the suspend/resume enable bit must be set, we must have shadow RAM, and
28  ; shadow RAM must not be relocated to 1M.
29
30          CLI                             ;No interrupts during suspend
31          PUSH    AX                      ;Save only what we need for now
```

```
32          PUSH    DX
33          MOV     AH,ECMOS_LeAP_Flags+NMI_Off     ;Get LeAP flags from ECMOS
34          CALL    Get_CMOS                        ; and also turn NMIs off
35          TEST    AL,SusRes_Enable                ;Is suspend/resume enabled?
36          JZ      No_Suspend                      ;No, do not suspend
37          CALL    Have_Shadow_RAM                 ;Do we have shadow RAM?
38          JNZ     No_Suspend                      ; no, do not suspend
39          POP     DX                              ;Clean out stack
40          POP     AX                              ; to save some stack space
41          JMP     SHORT Do_Suspend                ;Go do suspend proper
42
43  ; If the conditions aren't right, we just return from here. If we were
44  ; called from a power switch off NMI, then the PCU will turn the power off
45  ; in approx 2 seconds. If we were called from an application or a keyboard
46  ; interrupt, we would effectively be ignoring their suspend request.
47
48  No_Suspend:
49          MOV     AL,ECMOS_LeAP_Flags             ;Turn NMIs
50          OUT     CMOS_Index,AL                   ; back on
51
52          POP     DX
53          POP     AX
54          STC                                     ;Return carry to indicate error
55          STI                                     ;Turn interrupts back on
56          RET
57
58  ; Save all the CPU regs that we can on the application stack. These are
59  ; AX, BX, CX, DX, DI, SI, BP, SP (Exx if 386), DS, ES (and FS, GS if 386),
60  ; DRx, TRx, CR2, CR3 (if 386).
61
62  Do_Suspend:
63          CALL    Is_Processor_386                ;Dynamically check proc type
64          JZ      Save_286_Regs                   ;Go save 286 registers
65  .386P
66          PUSHAD                                  ;Save all 386SX general regs
67          MPUSH   CR2                             ;Save control registers
68          MPUSH   CR3
69          MPUSH   DR0                             ;Save debug registers
70          MPUSH   DR1
71          MPUSH   DR2
72          MPUSH   DR3
73          MPUSH   DR6
74          MPUSH   DR7
75          MPUSH   TR6                             ;Save test registers
76          MPUSH   TR7
77          PUSH    FS                              ;Save 386SX only segregs
78          PUSH    GS
79  .286
80          JMP     SHORT Save_Common_Regs
81  Save_286_Regs:
82          PUSHA                                   ;Save all 286 general regs
83  Save_Common_Regs:
84          PUSH    DS                              ;Save 286/386SX segregs
85          PUSH    ES
86
87  ; Turn on shadow RAM at E000 to save things that cannot be saved on the
88  ; application's stack, which is most everything under the sun.
89
90          MOV     DX,Chips_Index                  ;LeAP chipset index port
```

```
 91          CALL    ShaRAM_On_E000                ;Enable shadow RAM at E000
 92
 93  ; We're saving SS:SP down here even though SP was saved in the PUSHA up
 94  ; there, because we need to have the value of SP in a place that is
 95  ; accessible without a stack, namely the suspend/resume save area in
 96  ; segment E000.
 97
 98          MOV     DS,Sus_Res_Address            ;Set data segment to E000
 99          MOV     ROM_Config,CL                 ; save rom config (65)
100          MOV     Mem4_Enable,CH                ; save mem enable 4 (69)
101          MOV     SS_Reg,SS                     ; save stack segment
102          MOV     SP_Reg,SP                     ; ditto stack pointer
103          CALL    Save_MSW                      ;Save MSW/CR0
104
105  ; Steal the NMI vector back from DOS or whoever, so that during while we are
106  ; suspending, nobody will be dorking around with memory.
107
108          MOV     AL,ECMOS_LeAP_Flags+NMI_Off   ;Turn off NMI
109          OUT     CMOS_Index,AL                 ; before touching vector
110
111          MOV     DS,INT_Address                ;Save INT 2 vector
112          MOV     SI,8                          ;Move 2 words from vector area
113          MOV     ES,Sus_Res_Address            ; to suspend/resume save area
114          MOV     DI,OFFSET NMI_Vector          ;Save location for NMI vector
115          MOV     CX,2                          ;Move 2 words
116          CLD                                   ;Inc si, di after each move
117          REP     MOVSW                         ;Move string word
118
119          MOV     ES,INT_Address                ;Access interrupt vector area
120          MOV     DI,8                          ; and set the INT 2 vector
121          MOV     AX,OFFSET NMI_Interrupt       ; to BIOS interrupt handler
122          STOSW
123          MOV     AX,0F000H
124          STOSW
125
126          MOV     AL,ECMOS_LeAP_Flags           ;Turn NMI back on so that
127          OUT     CMOS_Index,AL                 ; retriggers will get serviced
128
129  ; Point segment registers to segment E000, and stack pointer to a suspend
130  ; resume stack area in segment E000.
131
132          MOV     DS,Sus_Res_Address            ;Set data segment to E000
133          MOV     ES,Sus_Res_Address            ;Set extra segment to E000
134          MOV     SS,Sus_Res_Address            ;Set stack segment to E000
135          MOV     SP,OFFSET Sus_Res_Stack       ;Set SP to top of E000 segment
136
137  ; Save DMA page registers.  This has to be done early so that we can use an
138  ; unused dma page register (85h) as the suspend in progress flag.
139
140          MOV     DI,OFFSET DMA_Page_Regs       ;Save area for dma page regs
141          MOV     DX,Page_Base                  ;Base port addr for page regs
142          MOV     CX,16                         ;Number of page registers
143  Save_Page_Loop:
144          IN      AL,DX                         ;Input page reg
145          STOSB                                 ;Save it
146          INC     DX                            ;Point to next page reg
147          LOOP    Save_Page_Loop
148
149  ; Set a suspend in progress flag in an unused DMA page register here so that
```

```
150  ; nmi_interrupt will start retriggering NMI for us right away, but the suspend
151  ; doesn't stick until we put a valid checksum into RAM and set the suspended
152  ; bit in ECMOS at the end of this procedure. Also leave NMIs on so that the
153  ; retriggered NMIs will get serviced. This just has to be done before the
154  ; PCU timeouts and powers down, which is on the order of a second. So far, we
155  ; haven't taken nearly that long -- in fact the most time consuming work is
156  ; the checksum, which happens after this.
157
158          MOV     AL,Suspend_In_Progress          ;Set a flag
159          OUT     POST_LeAP_Flags,AL              ; in an unused dma page reg
160          MOV     AL,ECMOS_LeAP_Flags             ;Make sure NMIs are
161          OUT     CMOS_Index,AL                   ; left on
162
163  ; Turn off interrupts at the source by masking all channels in the 8259s off
164  ; so that when we call int 10 and int 15 later on, we won't get an interrupt-
165  ; on window. But first we must save INTerrupt Controller registers, all two
166  ; of them. Note that this just has to be done sometime before those
167  ; software interrupts, it doesn't have to be done first thing. Asynchronous
168  ; interrupts like clock tick are already turned off with the CLI up there.
169
170          IN      AL,I8259_A1                     ;Read INTC1 int mask reg
171          MOV     INTC1_Mask,AL                   ;Save it
172          IN      AL,I8259A_A1                    ;Read INTC2 int mask reg
173          MOV     INTC2_Mask,AL                   ;Save it
174          CALL    Mask_All_Ints                   ;Mask off all interrupts
175
176  ; Save LeAP chipset registers by using a table, indexed_regs.
177
178          MOV     DX,Chips_Index                  ;LeAP chipset index port
179          MOV     DI,OFFSET Indexed_Regs          ;Table of indexed regs to save
180          MOV     CX,Indexed_Regs_Size            ;Number of entries
181  Save_LeAP_Loop:
182          MOV     AL,CS:[DI]                      ;Get register index
183          INC     DI                              ;Point to save location
184          CALL    Chip_Read                       ;Read register
185          MOV     BX,CS:[DI]                      ;Get save location
186          ADD     DI,2                            ;Point to next entry
187          MOV     [BX],AH                         ;Save register
188          LOOP    Save_LeAP_Loop
189
190  ; Special case: bit 3 of reg 70 has to be saved as a 0, otherwise we'll get
191  ; an NMI when we restore it.
192
193          AND     BYTE PTR Sleep_Reg,NOT PCU_NMI_Occurred
194
195  ; Save numeric coprocessor registers
196
197          FNSAVE  NPX_Regs                        ;Look ma, no wait!
198
199  ; Save DMA registers. Note:
200  ; - even though DMAs are in the 206 chip, which has power applied to it
201  ;   all the time, many of the registers are reset to default values on
202  ;   power up, so we still have to save them;
203  ; - many registers, e.g. the base address and word count registers, and
204  ;   other things that define the state of the DMA, e.g. the byte pointer
205  ;   flip flop and the mode register counter, are write-only so they
206  ;   cannot be saved. May their souls rest in peace ...
207
208          MOV     DI,OFFSET DMA_Regs              ;Save area for both DMAs' regs
```

```
209         CLD                                     ;Inc di after stos
210
211         OUT     DMA_BaseA+DMA_FF,AL             ;Clear byte ptr flip flop
212         MOV     DX,DMA_BaseA                    ;Base addr for DMA1
213         MOV     BX,1                            ;Port addr go up by 1 for DMA1
214 Save_Next_Addr_Count:
215         MOV     CX,8                            ;Four addr and four counts
216 Save_Addr_Count_Loop:
217         IN      AL,DX                           ;Read addr/count lo byte
218         STOSB                                   ;Save it
219         IN      AL,DX                           ;Read addr/count hi byte
220         STOSB                                   ;Save it
221         ADD     DX,BX                           ;Point to next port
222         LOOP    Save_Addr_Count_Loop
223
224         CMP     DX,DMA_BaseB                    ;Have we done dma2?
225         JAE     Done_Save_Addr_Count            ;Yeah, go save other stuff
226
227         OUT     DMA_BaseB+(DMA_FF*2),AL ;Clear byte ptr ff on dma2
228         MOV     DX,DMA_BaseB                    ;Base addr for dma2
229         MOV     BX,2                            ;Port addr go up by 2 for dma2
230         JMP     SHORT Save_Next_Addr_Count      ;Save addr and count for dma2
231 Done_Save_Addr_Count:
232
233         MOV     SI,OFFSET DMA_Ports_Sav         ;Table of dma regs (save)
234         MOV     CX,DMA_Ports_Size               ;Number of entries
235         IN      AL,DMA_BaseA+DMA_Clr_Ctr        ;Clr mode reg counter in dma1
236         IN      AL,DMA_BaseB+(DMA_Clr_Ctr*2)    ;Clr mode reg counter in dma2
237         XOR     DH,DH                           ;Clear upper 8 bit of i/o addr
238 Save_DMA_Loop:
239         MOV     DL,CS:[SI]                      ;Get port addr
240         INC     SI                              ;Point to next addr
241         IN      AL,DX                           ;Read value
242         STOSB                                   ;Save it
243         LOOP    Save_DMA_Loop
244
245 ; Save VGA registers using VGA BIOS.
246
247         MOV     AX,1C01H                        ;Func 1C, subfunc 1: save VGA
248         MOV     CX,0007H                        ;Save video hdw, BIOS, and DAC
249         MOV     BX,OFFSET VGA_Regs              ;Segment and offset of buffer
250         INT     10H                             ;Call video interface
251
252 ; Save 256K, i.e. 4 segments' worth, of video RAM
253
254         CALL    Setup_VGA                       ;Set up VGA for accessing VRAM
255         MOV     DX,Chips_Index                  ;LeAP chipset index port
256         CALL    ShaRAM_On_C_D000                ;Turn on shadow RAM @ C & D000
257         SavBitP 0C000H,0                        ;Save bit plane 0 to 0C000H
258         SavBitP 0D000H,1                        ;Save bit plane 1 to 0D000H
259         CALL    ShaRAM_On_A_B000                ;Turn on shaRAM at A & B000
260         MovSeg  0A000H,0C000H                   ;Move segment C000 to A000
261         MovSeg  0B000H,0D000H                   ;Move segment D000 to B000
262         CALL    ShaRAM_Off_A_B000               ;Turn off shaRAM at A & B000
263         SavBitP 0C000H,2                        ;Save bit plane 2 to 0C000H
264         SavBitP 0D000H,3                        ;Save bit plane 3 to 0D000H
265         CALL    ShaRAM_On_A_B000                ;Turn it back on for checksum
266
267 ; Save chipset registers having to do with memory sizing in ECMOS so that we
```

```
268   ; can configure memory on power up before having access to DRAM.
269
270         MOV     DS,Sus_Res_Address           ;Segment of register save area
271         MOV     AH,ECMOS_Save_Area           ;ECMOS location to use for
272         MOV     AL,Mem1_Enable               ; saving memory enable 1
273         CALL    Put_CMOS
274         MOV     AL,Bank01_Enable             ; saving bank 0 & 1 enable
275         CALL    Put_CMOS
276         MOV     AL,DRAM_Config               ; saving DRAM configuration
277         CALL    Put_CMOS
278         MOV     AL,Bank23_Enable             ; saving bank 2 & 3 enable
279         CALL    Put_CMOS
280         MOV     AL,Misc                      ; saving miscellaneous reg
281         CALL    Put_CMOS
282
283         MOV     AH,ECMOS_Status              ;Initial index in CMOS
284         CallBX  Chksum_ECMOS                 ;Call via BX ECMOS chksum routine
285         MOV     AL,DL                        ;Write new checksum
286         CALL    Put_CMOS                     ; to ECMOS
287
288   ; Call suspend extension function.  TSRs can hook into this function number
289   ; and save more stuff.
290
291         MOV     AX,42CAH                     ;Call func 42 subfunc CA
292         INT     15H                          ; of int 15
293
294   ; Save the bottom 2K of segment 0000 because on resume POST will use that
295   ; area as a stack.
296
297         MOV     ES,Sus_Res_Address           ;Copy to segment E000
298         MOV     DI,OFFSET Bottom_2K          ; at this offset
299         XOR     SI,SI                        ; from offset 0000
300         MOV     DS,SI                        ; in segment 0000
301         MOV     CX,400H                      ;Copy 1K words
302         CLD                                  ;Inc SI, DI after move
303         REP     MOVSW                        ;Move string word at a time
304
305   ; Checksum 00800 thru DFFFF plus the register save area in segment E000.
306
307         MOV     DI,OFFSET SR_CheckSum        ;Chksum 15 segments and save
308         CALL    Sum_SavedRAM                 ; their chksums in this array
309
310   ; Set the suspended bit in ECMOS. This is what tells POST to try and resume.
311   ; If we die before this or got reset, POST will just cold boot.
312
313         MOV     AH,ECMOS_LeAP_Flags          ;Get LeAP flags
314         CALL    Get_CMOS                     ; from ECMOS
315         OR      AL,Suspended                 ;Set this bit
316         DEC     AH                           ;Point back to flag byte
317         CALL    Put_CMOS                     ; and write it out
318
319   ; Clear suspend in progress bit to tell PCU NMI interrupt handler to stop
320   ; retriggering NMIs.
321
322         MOV     AL,0                         ;Clear flag
323         OUT     POST_LeAP_Flags,AL           ; in an unused dma page reg
324
325   ; Last one out turn the lites off!
326
```

```
327            WrChip  LEAP_Power_Ctrl,Memory_Power    ;Turn off everything but mem
328    Wait_For_Lites_Out:
329            HLT                                     ;Hold still and wait for
330            JMP     Wait_For_Lites_Out              ; power to go down
331
332    Suspend ENDP
333
334    ;*********************************************************************
335    ; This is the resume function. It is called after power on diagnostics
336    ; that are otherwise identical to a cold start except no RAM was tested.
337    ; If the user wants to test all of RAM, s/he will have to turn off the
338    ; suspend/resume feature and cycle the power off and on.
339    ;*********************************************************************
340
341    Resume  PROC    NEAR
342
343            CLI                                     ;No interrupts while resuming
344
345    ; Setup resume stack in segment E000
346
347            MOV     DX,Chips_Index                  ;LeAP chipset index port
348            CALL    ShaRAM_On_E000                  ;Turn on shadow RAM at E000
349            MOV     SS,Sus_Res_Address              ;Set stack segment to E000
350            MOV     SP,OFFSET Sus_Res_Stack         ;Set SP to top of E000 segment
351
352    ; Prepare memory for checksum test: sysBIOS in ROM at F0000, saved system RAM
353    ; from 00800 thru 9FFFF, saved video RAM from A0000 thru DFFFF, saved
354    ; registers at E0000.
355
356            CALL    No_ROM_All_RAM                  ;Except sysBIOS in ROM at F000
357
358    ; Checksum 00800 thru DFFFF plus the register save area in segment E000.
359
360            MOV     DI,OFFSET (SR_CheckSum+(15*2))  ;Chksum 15 segments and save
361            CALL    Sum_SavedRAM                    ; their chksums in this array
362
363            MOV     ES,Sus_Res_Address              ;Point both es and ds to the
364            MOV     DS,Sus_Res_Address              ;;suspend resume save area
365            MOV     DI,OFFSET SR_CheckSum           ;Pt es:di to suspend chksums
366            MOV     SI,OFFSET (SR_CheckSum+(15*2))  ;Pt ds:si to resume chksums
367            MOV     CX,15                           ;Compare 15 pairs of chksums
368            REPE    CMPSW                           ;Find first non-match
369            JZ      CheckSum_OK                     ;Yay! Go restore everything
370
371    ; Checksum failed, ask user whether to resume anyway or give up do a reset.
372
373            CALL    ShaRAM_Off_C_D000               ;So we can call video BIOS
374            CALL    ShaRAM_Off_A_B000               ;So we can write to videoRAM
375            MOV     SI,OFFSET Resume_Anyway_Msg     ;Get offset to "F3 to resume"
376            CALL    Display_Message                 ;Display the message
377            STI                                     ;Allow keyboard 'rupts
378    FuncKey_Wait:
379            XOR     AH,AH                           ;Read key from keyboard
380            INT     16H                             ;Use BIOS to read key
381            CMP     AH,03DH                         ;Was it F3
382            JE      Do_A_Reset                      ;Yes
383            CMP     AH,03EH                         ;Was it F4
384            JE      Resume_Anyway                   ;Yes
385            JMP     SHORT FuncKey_Wait              ;Do dat funky wait!
```

```
386
387 Do_A_Reset:
388         XOR     AH,AH                           ;Shutdown zero
389         JMP     Virtual_Shutdown                ;Reset this baby
390
391 Resume_Anyway:
392         CLI                                     ;No interrupts while resuming
393         MOV     DX,Chips_Index                  ;LeAP chipset index port
394         CALL    No_ROM_All_RAM                  ;Turn off all ROM and turn on all shaRAM
395 CheckSum_OK:
396
397 ; Call resume extension function.  TSRs can hook into this function number
398 ; and restore more stuff.
399
400         MOV     DS,Sus_Res_Address              ;Segment and
401         MOV     BX,OFFSET Bottom_2K             ; offset of saved vectors
402         MOV     AX,42CBH                        ;Call int15 func42 subfunc CA
403         PUSHF                                   ;To fake a
404         CALL    DWORD PTR [BX+15H*4]            ; software interrupt to int 15
405
406 ; Restore 256K of video RAM
407
408         CALL    Setup_VGA                       ;Set up VGA for accessing VRAM
409         CALL    Setup_VGA_Write                 ;Set up VGA for writing VRAM
410
411         MOV     DX,Chips_Index                  ;LeAP chipset index port
412         CALL    ShaRAM_Off_A_B000               ;Turn off shaRAM at A & B000
413         RstBitP 3,0D000H                        ;Restore bit plane 3 from 0D000H
414         RstBitP 2,0C000H                        ;Restore bit plane 2 from 0C000H
415         CALL    ShaRAM_On_A_B000                ;Turn on shaRAM at A & B000
416         MovSeg  0D000H,0B000H                   ;Move segment B000 to D000
417         MovSeg  0C000H,0A000H                   ;Move segment A000 to C000
418         CALL    ShaRAM_Off_A_B000               ;Turn off shaRAM at A & B000
419         RstBitP 1,0D000H                        ;Restore bit plane 1 from 0D000H
420         RstBitP 0,0C000H                        ;Restore bit plane 0 from 0C000H
421
422 ; Restore the bottom 2K of segment 0000, then restore NMI vector, which
423 ; was saved separately during suspend.
424
425         MOV     DS,Sus_Res_Address              ;Copy from segment E000
426         MOV     SI,OFFSET Bottom_2K             ; at this offset
427         XOR     DI,DI                           ; to offset 0000
428         MOV     ES,DI                           ; in segment 0000
429         MOV     CX,400H                         ;Copy 1K words
430         CLD                                     ;Inc SI, DI after each move
431         REP     MOVSW                           ;Let 'er rip
432
433         MOV     SI,OFFSET NMI_Vector            ;Move 2 words from
434         MOV     DI,8                            ; suspend/resume save area
435         MOV     CX,2                            ; to vector area
436         REP     MOVSW                           ;Move string word
437
438 ; Restore VGA registers
439
440         CALL    ShaRAM_Off_C_D000               ;So we can call video BIOS
441         MOV     AX,1C02H                        ;Func 1C.02: restore VGA
442         MOV     CX,0007H                        ;Restore video hdw, BIOS & DAC
443         MOV     ES,Sus_Res_Address              ;Segment and
444         MOV     BX,OFFSET VGA_Regs              ; offset of buffer
```

```
445         INT     10H                             ;Call video interface
446
447 ; Restore numeric coprocessor registers
448
449         MOV     DS,Sus_Res_Address              ;Segment of save area
450         FRSTOR  NPX_Regs
451
452 ; Restore DMA registers.
453
454         MOV     SI,OFFSET DMA_Regs              ;Save area for both DMA's regs
455         CLD                                     ;Inc si after lods
456
457         OUT     DMA_BaseA+DMA_FF,AL             ;Clear byte ptr flip flop
458         MOV     DX,DMA_BaseA                    ;Base addr for DMA1
459         MOV     BX,1                            ;Port addr go up by 1 for DMA1
460 Rst_Next_Addr_Count:
461         MOV     CX,8                            ;Four addr and four counts
462 Rst_Addr_Count_Loop:
463         LODSB                                   ;Get addr/count lo byte
464         OUT     DX,AL                           ;Restore it
465         LODSB                                   ;Get addr/count hi byte
466         OUT     DX,AL                           ;Restore it
467         ADD     DX,BX                           ;Point to next port
468         LOOP    Rst_Addr_Count_Loop
469
470         CMP     DX,DMA_BaseB                    ;Have we done dma2?
471         JAE     Done_Rst_Addr_Count             ;Yeah, go restore other stuff
472
473         OUT     DMA_BaseB+(DMA_FF*2),AL         ;Clear byte ptr ff on dma2
474         MOV     DX,DMA_BaseB                    ;Base addr for dma2
475         MOV     BX,2                            ;Port addr go up by 2 for dma2
476         JMP     SHORT Rst_Next_Addr_Count       ;Restore addr and count for dma2
477 Done_Rst_Addr_Count:
478
479         MOV     DI,OFFSET DMA_Ports_Rst         ;Table of dma ports (restore)
480         MOV     CH,2                            ;Number of DMAs
481         XOR     DH,DH                           ;Clr upper 8 bits of I/O addr
482 Rst_DMA_Loop:
483         MOV     DL,CS:[DI]                      ;Get command port
484         INC     DI                              ;Point to next port
485         LODSB                                   ;Get command reg value
486         OUT     DX,AL                           ;Restore it
487
488         MOV     DL,CS:[DI]                      ;Get request port
489         INC     DI                              ;Point to next port
490         LODSB                                   ;Get request reg value
491         MOV     AH,AL                           ;Save it for later
492         MOV     CL,3                            ;Start from bit 3
493 Req_Loop:
494         MOV     AL,AH                           ;Get request bits
495         SHR     AL,CL                           ;Isolate bit 'cl'
496         AND     AL,01H                          ;Mask out all other bits
497         SHL     AL,2                            ;Put req bit in bit position 2
498         OR      AL,CL                           ;Set channel select bits
499         OUT     DX,AL                           ;Restore req bit
500         SUB     CL,1                            ;Loop for other req bits
501         JNC     Req_Loop                        ; down to bit 0
502
503         MOV     DL,CS:[DI]                      ;Get mode port
```

| | | | |
|---|---|---|---|
| 504 | INC | DI | ;Point to next port |
| 505 | XOR | CL,CL | ;Start with channel 0 |
| 506 | Mode_Loop: | | |
| 507 | LODSB | | ;Get mode reg value for this channel |
| 508 | AND | AL,0FCH | ;Clear bits 1 and 0 |
| 509 | OR | AL,CL | ;Set channel select bits |
| 510 | OUT | DX,AL | ;Restore mode reg value |
| 511 | INC | CL | ;Loop for other channels |
| 512 | CMP | CL,4 | ; until channel 3 |
| 513 | JNE | Mode_Loop | ; is done |
| 514 | | | |
| 515 | MOV | DL,CS:[DI] | ;Get request mask port |
| 516 | INC | DI | ;Point to next port |
| 517 | LODSB | | ;Get req mask reg value |
| 518 | OUT | DX,AL | ;Restore it |
| 519 | | | |
| 520 | DEC | CH | ;Loop for other dma |
| 521 | JNZ | Rst_DMA_Loop | |
| 522 | | | |
| 523 | ; Restore DMA page registers | | |
| 524 | | | |
| 525 | MOV | SI,OFFSET DMA_Page_Regs | ;Save area for dma page regs |
| 526 | MOV | DX,Page_Base | ;Base port addr for page regs |
| 527 | MOV | CX,16 | ;Number of page registers |
| 528 | Rst_Page_Loop: | | |
| 529 | LODSB | | ;Read page reg value |
| 530 | OUT | DX,AL | ;Restore it |
| 531 | INC | DX | ;Point to next page reg |
| 532 | LOOP | Rst_Page_Loop | |
| 533 | | | |
| 534 | ; Restore INTerrupt Controller registers, all two of them. | | |
| 535 | | | |
| 536 | MOV | AL,INTC1_Mask | ;Get INTC1 int mask reg |
| 537 | OUT | I8259_A1,AL | ;Restore it |
| 538 | MOV | AL,INTC2_Mask | ;Get INTC2 int mask reg |
| 539 | OUT | I8259A_A1,AL | ;Restore it |
| 540 | | | |
| 541 | ; Set up BIOS(es) in shadow RAM if necessary and possible. | | |
| 542 | | | |
| 543 | MOV | DX,Chips_Index | ;LeAP chipset index port |
| 544 | CALL | ShaRAM_On_A_B000 | ;Turn on shaRAM at A & B000 |
| 545 | CALL | Is_RAM_BIOS_OK | ;Can we copy BIOSes to RAM? |
| 546 | JC | Done_RAM_BIOS | ;No, go on |
| 547 | | | |
| 548 | TEST | AL,User_System_BIOS | ;Are we copying sysBIOS? |
| 549 | JZ | Done_Sys_BIOS | ;No -Skip copying System BIOS |
| 550 | CLI | | ;No 'rupts when moving sysBIOS |
| 551 | PUSH | AX | ;Save ECMOS opt1 byte |
| 552 | MovSeg | 0B000H,0F000H | ;Copy 64k to B000 from F000 |
| 553 | JMPF | 0B000H,Bank_B000 | ;Far jump to segment B000 |
| 554 | Bank_B000: | | |
| 555 | CALL | Setup_System_Shadow_RAM | ;Disable ROM-BIOS,enable RAM |
| 556 | MovSeg | 0F000H,0B000H | ;Copy 64k to F000 from B000 |
| 557 | JMPF | 0F000H,Bank_F000_a | ;Far jump to segment F000 |
| 558 | Bank_F000_a: | | |
| 559 | CALL | Write_Protect_System_RAM | ;Write-protect shaRAM @ F000 |
| 560 | CALL | Compute_CPU_Speed | ;Compute CPU_Rate variable |
| 561 | POP | AX | ;Restore ECMOS opt1 byte |
| 562 | Done_Sys_BIOS: | | |

```
563
564           TEST     AL,User_Video_BIOS           ;Are we copying videoBIOS
565           JZ       Done_RAM_BIOS                ;No -Skip copying Video BIOS
566           CALL     Is_There_VideoBIOS           ;AA55 signature @ C000 ?
567           JNE      Done_RAM_BIOS                ;Done if not there
568           CALL     Get_Video_Checksum           ;Is video BIOS copyable?
569           JNZ      Done_RAM_BIOS                ;No -Dont copy into ram
570           MovSeg   0B000H,0C000H                ;Copy 64k to B000 from C000
571           CALL     Setup_Video_Shadow_RAM       ;Disable video ROM, enable RAM
572           MovSeg   0C000H,0B000H                ;Copy 64k to C000 from B000
573           CALL     Write_Protect_Video_RAM      ;Make videoBIOS shaRAM read-only
574 Done_RAM_BIOS:
575
576           MOV      DX,Chips_Index               ;LeAP chipset index port
577           CALL     ShaRAM_Off_A_B000            ;Turn off shaRAM at A & B000
578
579 ; Restore LeAP chipset registers
580
581           MOV      DS,Sus_Res_Address           ;Segment of save area
582           MOV      DX,Chips_Index               ;LeAP chipset index port
583           MOV      DI,OFFSET Indexed_Regs       ;Table of indexed regs to restore
584           MOV      CX,Indexed_Regs_Size         ;Number of entries
585 Restore_LeAP_Loop:
586           MOV      AL,CS:[DI]                   ;Get register index
587           INC      DI                           ;Point to save location
588           MOV      BX,CS:[DI]                   ;Get save location
589           ADD      DI,2                         ;Point to next entry
590           MOV      AH,[BX]                      ;Get register value from save loc
591           CALL     Chip_Write                   ;Restore register
592           LOOP     Restore_LeAP_Loop
593
594 ; Grab the last pieces of data out of the suspend/resume save area in
595 ; segment E000.
596
597           MOV      BH,Rom_Config                ;Grab these before real mode
598           MOV      BL,Mem4_Enable               ; segment base becomes
599           MOV      CX,SP_Reg                    ; useless in protected mode
600           MOV      DX,SS_Reg                    ;Ditto SP and SS selector
601
602 ; Restore machine status word (286) or control register 0 (386).
603
604 .386P
605           CALL     Is_Processor_386             ;Dynamically check proc type
606           JZ       SHORT Restore_286_MSW        ;Is processor 386?
607           MOV      EAX,DWORD PTR CR0_Reg        ; yes, restore 386 CR0
608           MOV      CR0,EAX                      ; from save area
609           JMP      SHORT Done_Restore_MSW       ; & go on
610 Restore_286_MSW:
611           LMSW     WORD PTR MSW_Reg             ;Restore 286 MSW
612 Done_Restore_MSW:
613 .286
614
615 ; Point SS:SP to the suspended application's stack and start using it.
616
617           MOV      SP,CX                        ;Restore stack pointer
618           MOV      SS,DX                        ;Restore stack segment
619
620 ; Restore special cases, LeAP "ROM Config," and "Mem Enable 4," because
621 ; we need access to shadow RAM at E000 up until now.
```

```
622
623         MOV     DX,Chips_Index              ;LeAP chipset index port
624         RstReg  NEAT_Rom_Config,BH          ;Restore rom config
625         RstReg  NEAT_Mem4_Enable,BL         ;Restore mem enable 4 (69)
626
627 ; Restore pre-suspend regs.
628
629         POP     ES                          ;Restore 286/386SX segregs
630         POP     DS
631
632         CALL    Is_Processor_386            ;Dynamically check proc type
633         JZ      Restore_286_Regs            ;Go restore 286 registers
634 .386P
635         POP     GS                          ;Restore 386SX only segregs
636         POP     FS
637         MPOP    TR7                         ;Restore test registers
638         MPOP    TR6
639         MPOP    DR7                         ;Restore debug registers
640         MPOP    DR6
641         MPOP    DR3
642         MPOP    DR2
643         MPOP    DR1
644         MPOP    DR0
645         MPOP    CR3                         ;Restore control registers
646         MPOP    CR2
647         POPAD                               ;Restore all 32 bit genregs
648 .286
649         JMP     SHORT Done_Restore
650 Restore_286_Regs:
651         POPA                                ;Restore all 16 bit genregs
652 Done_Restore:
653
654 ; The RET will take us back to whoever called the suspend routine.
655
656         CLC                                 ;Clr carry to indicate success
657         STI                                 ;Turn 'rupts back on
658         RET
659
660 Resume  ENDP
```

EXHIBIT B

PRODUCT SPECIFICATIONS FOR LeAPset CS8223 (LeAPset-sx CS8283)

Low-Powered Enhanced AT Portable
LeAPset CS8223 (LeAPset-sx CS8283)

100% IBM PC/AT Compatible AT CHIPSet for 12, 16 and 20 MHz *Laptop* Systems

100% compatible to CHIPS' NEAT CHIPSet (CS8221)

Special power save features to accomodate laptop low power requirements:

Complete System board requires only 17 logic components plus memory and processors Power Control Unit (PCU) to control system power sources Supports Single ROM for both System and Video BIOS Sleep mode
Slow Refresh DRAM support
Suspend/Resume Support
Selectable operating frequencies
Auto power off feature Supports 80286 and 80386sx microprocessors Supports ROM cartridges Supports three programmable I/O decodes Supports password/security EEPROMs Two multipurpose programmable parallel I/O ports

---

The LeAPset CS8223 (LeAPset-sx CS8283), are very highly integrated application specific integrated circuits which implement the control logic used in the IBM PC AT compatible computers with additional functions included for laptop use and efficiency. The CS8223 CHIPset supports a 80286 based system, while the CS8283 CHIPSet supports the 80386sx based system. The CS8223 CHIPSet consists of the following:

- 82C241 includes the CPU/BUS, the Page/Interleave and EMS memory controller in addtion to some laptop specific control features. Essentially it is a superset of the NEAT 82C211 and 82C212
- 82C242 includes the Data/Address buffers and the bus conversion logic
- 82C636, the Power Control Unit which controls the system power and provides slow refresh DRAM support in standby mode
- 82C206, the Integrated Peripherals Controller
- 82C609, the multifunction controller which provides one parallel port and two UART channel interfaces
- 82C425 (or 82C455) LCD (or advanced LCD) controller.

The difference between the CS8223 and CS8283 CHIPSets is one component. The 82C241 is used in an 80286 system and the 82C841 is used in an 80386sx based system. They are functionally identical, but differ in their CPU interfaces. LeAPset CS8223(LeAPset-sx CS8283) CHIPSets are 100% compatible with the NEAT CHIPSet. They are designed to be specifically used in laptops. However, they can be used to implement a small footprint desktop machine where integration is the critical factor. As these CHIPSets are completely compatible with the NEAT CHIPSet, only the additional features will be described here. For detailed NEAT features see the NEAT CHIPSet data book.

PRODUCT SPECIFICATIONS FOR LeAPset CS8223(LeAPset-sx CS8283)

82C241 (82C841) System Controller Specifications

Features:

● Includes 82C211 Bus controller features:

- Clock Generation with programmable speed selection
- Optional Independent AT bus clock
- CPU interface and bus control
- Programmable command delays and wait state generation
- Port B register and NMI logic
- CPU state machine, AT bus state machine and bus arbitration logic
- Action Code generation logic
- DMA and Refresh logic
- Numeric Coprocessor interface logic
- Configuration Registers

- Includes 82C212 Page/Interleave and EMS memory controller features:

- Page mode access including single bank, odd number of banks, 2 way and 4 way interleave, providing higher performance over conventional DRAM accessing schemes
    - Supports 100ns and 80ns DRAMs at 16MHz and 20MHz respectively, using page mode operation
    - Supports up to 4 banks of on board memory, up to 8M Bytes using 1Mx1 DRAMs
    - Provides remapping of RAM resident in 640k to 1Mbyte area to the top of the 1Mbyte address space
    - Supports LIM-EMS 4.0 with four EMS page registers on chip and up to 512 page registers via external EMS mapper chips, 82C631
    - Shadow RAM features for efficient System and Video BIOS execution
    - OS/2 Optimization features allow fast switching between protected and real mode
    - Staggered refresh to reduce power supply noise
    - Supports external EMS mapper interface

- Supports Sleep mode by shutting off the clock

- Supports up to 3 programmable decodes for I/O addresses

- Supports single BIOS EPROM option and combined Video BIOS

- Supports ROM cartridge option

Refer to the CHIPS' CS8221 New Enbanced AT(NEAT) data book for detailed 82C211 and 82C212 functional specifications. Additional laptop oriented power-save features will be discussed in a later section.

We claim:

1. A method for reducing power consumption in a battery powered computer comprising at least random access memory ('RAM') main memory, RAM main memory further comprising a shadow RAM memory, central processing unit, On/Off signal monitoring means, peripheral devices with a plurality of registers, video memory, and an On/Off switch, the method comprising the steps of:

monitoring the switch for an OFF signal;
   storing the contents of the plurality of registers of the central processing unit, the peripheral devices and the contents of the video memory in shadow RAM memory upon receipt of the OFF signal;
   disconnecting the battery power to the entire computer except the RAM and On/Off signal monitoring means after the storing step is completed;
   monitoring the switch using the On/Off signal monitoring means for an ON signal;
   reconnecting the battery power to the entire computer after the ON signal is received by the On/Off signal monitoring means; and
   restoring the computer to the state the computer was in prior to receiving the OFF signal by recalling the contents of the plurality of registers of the central processing unit, the peripheral devices and the contents of video memory from shadow RAM upon receipt of an ON signal.

2. The method of claim 1 wherein only 256K bytes of the video memory are stored in the RAM.

3. The method of claim 1 wherein the stored contents of the video memory and the plurality of registers of the central processing unit occupy less than 270K bytes of the RAM main memory.

4. The method of claim 1 wherein prior to the disconnecting step, all bytes stored in RAM are added together and the sum is stored in RAM, and after the reconnecting step all bytes stored in RAM are again added together and the sum compared with the previously stored sum, a disagreement between the two sums indicating that data has been corrupted.

5. In a battery-powered computer having a display, disk storage, random access main memory ('RAM') including shadow RAM memory, a central processing unit ('CPU'), On/Off signal monitoring means, peripheral devices having a plurality of registers, a video memory, and digital ON/OFF switch, a method for reducing power consumption comprising the steps of:

monitoring the switch using the On/Off signal monitoring means;
   storing the contents of the plurality of registers of the CPU and peripheral devices and the contents of video memory in shadow RAM when the switch is turned off;
   disconnecting the battery power to the disk storage, display, video memory, and CPU and peripheral devices;
   reconnecting the battery power to the disk storage, display, video memory, CPU and peripheral devices when the On/Off signal monitoring means detects that the switch is turned on; and
   restoring the stored contents from shadow RAM to the plurality of registers of the CPU, peripheral devices, and video memory.

6. The method of claim 5 wherein only 256K bytes of the video memory are stored in the RAM.

7. The method of claim 5 wherein the stored contents of the video memory and CPU occupy less than 270K bytes of RAM.

8. The method of claim 5 wherein prior to the disconnecting step, all bytes stored in RAM are added together and the sum is stored in RAM, and after the reconnecting step all bytes stored in RAM are again added together and the sum compared with the previously stored sum, a disagreement indicating alternation of data in the RAM during the period battery power was disconnected.

9. An apparatus for reducing power consumption in a battery powered computer with random access memory ('RAM') including shadow RAM, central processing unit ('CPU'), peripheral devices having a plurality of registers, video memory means, disk storage means and On/Off signal generator, the apparatus comprising:

Off signal monitoring means for detecting an Off signal;

On signal monitoring means for detecting an On signal; and memory control means coupled to the Off and On signal monitoring means and to the battery for reading and storing the contents of the CPU's and peripheral devices' plurality of registers and the contents of the video memory means in the shadow RAM when an Off signal is detected, for disconnecting the battery power to the CPU, video memory means, and disk storage after the contents are stored and for reconnecting the battery power to the CPU, video memory means, and disk storage and restoring the contents of the plurality of registers and the video memory means by removing the contents from shadow RAM when an On signal is detected by the On signal monitoring means.

* * * * *

REEXAMINATION CERTIFICATE (2893rd)

United States Patent [19]

Nguyen et al.

[11] B1 5,021,983
[45] Certificate Issued May 28, 1996

[54] SUSPEND/RESUME APPARATUS AND METHOD FOR REDUCING POWER CONSUMPTION IN BATTERY POWERED COMPUTERS

[75] Inventors: Au H. Nguyen, Santa Clara; Aurav R. Gollabinnie, San Jose, both of Calif.

[73] Assignee: Chips & Technologies, Inc., San Jose, Calif.

Reexamination Request:
No. 90/002,394, Jul. 31, 1991

Reexamination Certificate for:
Patent No.: 5,021,983
Issued: Jun. 4, 1991
Appl. No.: 434,201
Filed: Nov. 13, 1989

[51] Int. Cl.[6] ............................................. G06F 1/00
[52] U.S. Cl. ................................ 364/707; 395/182.22
[58] Field of Search ........................... 364/707, 200, 364/900; 371/66

[56] References Cited

U.S. PATENT DOCUMENTS

| | | | |
|---|---|---|---|
| 4,203,153 | 5/1980 | Boyd | 364/200 |
| 4,279,020 | 7/1981 | Christian et al. | 364/900 |
| 4,479,191 | 10/1984 | Nojima et al. | 364/707 |
| 4,590,553 | 5/1986 | Noda | 364/200 |
| 4,780,843 | 10/1988 | Tietjen | 364/900 |
| 4,851,987 | 7/1989 | Day | 364/200 |
| 4,907,150 | 3/1990 | Arroyo et al. | 364/200 |
| 4,907,183 | 3/1990 | Tanaka | 364/707 |
| 4,980,836 | 12/1990 | Carter et al. | 364/483 |
| 4,999,794 | 3/1991 | Yakushiji | 364/707 |

OTHER PUBLICATIONS

IBM PC Convertible Technical Reference—vol. 1 pp. 4–37 to 4–39.

*Primary Examiner*—David H. Malzahn

[57] ABSTRACT

A method and apparatus for suspending the operation of a computer at any desired point and resuming operation at exactly the same point is disclosed. At the point where suspension is chosen, the current state of the computer is stored in the computer's Random Access Memory and power is disconnected to all other components in the computer. When resumption of operation is commanded, power is restored to all components and the current computer state is retrieved from the Random Access Memory and restored, allowing operations to continue from exactly the same point as they were suspended. The invention encourages turning off the computer for even brief periods of non-use, as there is almost no waiting time when resumption of operation is commanded.

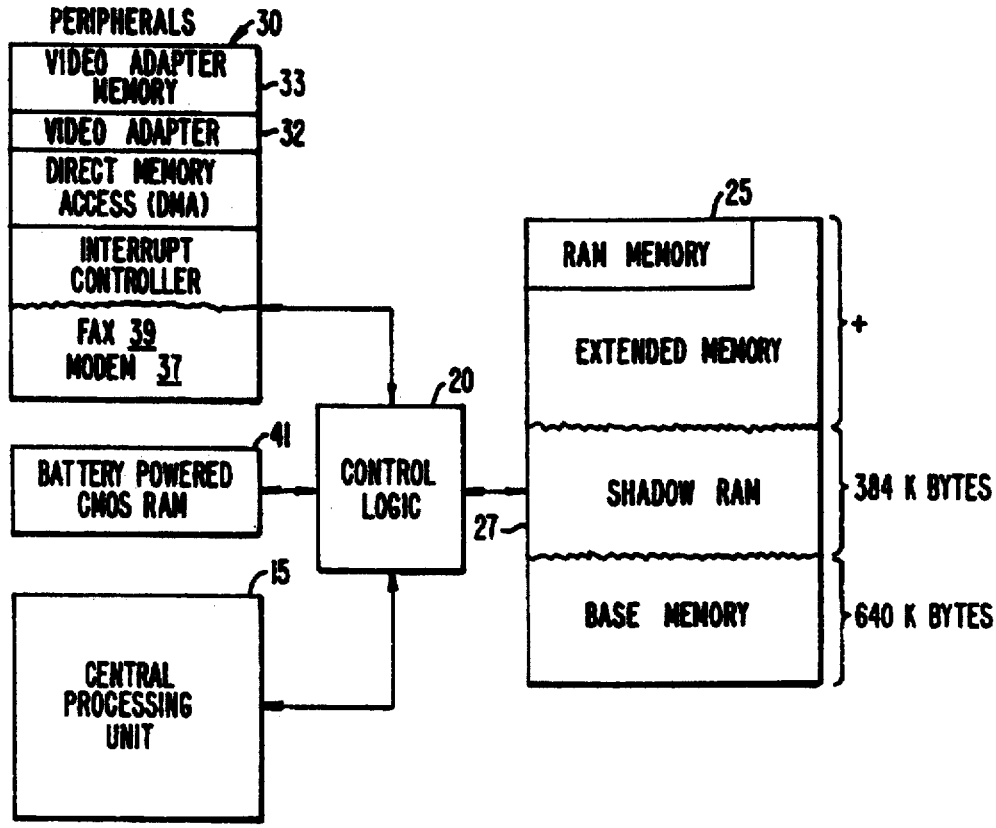

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *